United States Patent [19]

Harrop

[11] 3,962,156

[45] June 8, 1976

[54] TACKIFIER FOR RUBBER

[75] Inventor: William H. Harrop, Downingtown, Pa.

[73] Assignee: Rohm and Haas Company, Philadelphia, Pa.

[22] Filed: July 15, 1974

[21] Appl. No.: 488,379

[52] U.S. Cl. .................. 260/5; 260/4 AR; 260/51.5; 260/836; 260/845; 260/846
[51] Int. Cl.² .................. C08L 7/00; C08L 9/02; C08L 9/06; C08L 63/00
[58] Field of Search .............. 260/51.5, 846, 32.4, 260/5, 32.6 A, 32.6 PQ, 845, 847, 4, 836

[56] References Cited
UNITED STATES PATENTS 2,585,196  2/1952  Walton .................. 260/51.5
2,731,425  1/1956  Juda et al. .................. 260/51.5

OTHER PUBLICATIONS

Morton–Rubber Technology, (2nd Ed.), (van Nostrand), (N.Y.), (July 12, 1973), p. 245.

Primary Examiner—Donald E. Czaja
Assistant Examiner—H. H. Fletcher
Attorney, Agent, or Firm—Michael B. Fein

[57] ABSTRACT

The reaction of a predominantly monosubstituted phenol, and an aldehyde, and an aliphatic or cycloaliphatic polyamine containing at least two primary amine groups, the reaction product, the use of the reaction product to impart building tack to a rubber stock, and a blend of rubber and said reaction product.

4 Claims, No Drawings

TACKIFIER FOR RUBBER

BACKGROUND OF THE INVENTION

This invention relates to tackifiers for rubber, methods of using the tackifiers, and the rubber compositions containing the tackifiers.

Previous tackifiers for synthetic rubber have included hydrocarbon resins, coumarone-indene resins, polyterpenes, alkyl phenol/formaldehyde condensates and others. One disadvantage of the prior tackifiers is, however, that they do not provide sufficient tack in certain rubber unless high levels are used, and the high levels necessary adversely affect physical properties of the rubbers.

SUMMARY OF THE INVENTION

It has become an object to provide a tackifier which can be used at lower levels.

A further object is to provide a more efficient tackifier for synthetic rubber.

A still further object is to provide a method of imparting tack to rubber stock.

An additional object is to provide a rubber composition containing a novel tackifier.

Another object is to provide a novel reaction of an aldehyde, a substituted phenol, and a polyamine.

These objects, and others as will become apparent from the following description, are achieved by the present invention which comprises a tackifier comprising the reaction product of about 0.50 to 0.95 mole parts of ortho or para substituted phenol wherein the substituent is alkyl, alkoxy, or alkenyl, about 0.05 to 0.5 mole parts of aliphatic or cycloaliphatic polyamine containing at least two primary amine groups, and about 0.7 to 1.3 mole parts of aldehyde, in the presence of acid catalyst.

In another aspect the invention comprises synthetic rubber or mixtures of synthetic and natural rubber with about 2 to 20 parts of tackifier per 100 parts rubber.

In another aspect the invention comprises a method of imparting building tack to rubber comprising mixing the tackifier with the rubber.

In still another aspect the invention comprises the acid catalyzed reaction of a substituted phenol, an aldehyde, and a polyamine.

Preferably about 0.7 to 1.3 mole parts of aldehyde, about 0.50 to 0.95 mole parts of ortho or para substituted phenol, and about 0.05 to 0.5 mole parts of the aliphatic or cycloaliphatic polyamine containing at least two primary amine groups are reacted to make the tackifier composition.

The preferred aldehyde is formaldehyde, but lower alkyl aldehydes such as acetaldehyde, butyraldehyde, and the like can be used.

The preferred predominantly mono-substituted phenol is p-dodecyl phenol, but the substituent can be any alkyl group containing about 8 to 16 carbon atoms, such as isomeric octyl, nonyl, decyl groups, up to isomeric hexadecyl groups; any alkoxy group containing about 10 to 18 carbon atoms, such as dodecylethoxy, butoxybutoxy butyl, octoxy ethyl, and the like; alkenyl groups containing about 4 to 16 carbon atoms, such as butenyl, dodecenyl, or mixtures of mono-substituted phenols, either position isomers or different substituents or both. Isomeric mixtures are preferred since they are usually present in commercially available materials. By "predominantly" is meant over 50% by weight. Preferably, over 90% by weight of the phenol used is mono-substituted.

The aliphatic or cycloaliphatic polyamine containing at least two primary amine groups is preferably 1, 8-p-menthane diamine. Other polyamines which are useful include ethylene diamine, triethylene tetraamine, 1, 3-bis(aminomethyl) cyclohexane, m-xylylenediamine and the like.

The tackifier of the invention is suitably prepared under acid conditions by cocondensing the aldehyde with a blend of the phenol and the polyamine. Any suitable acid catalyst can be employed. For example, oxalic acid has been found to be useful, along with water in the initial reaction mixture as a solvent.

Usually the reaction is conducted at moderate temperatures, preferably about 20° to 150°C., and by slowly introducing the aldehyde into the reaction mixture. The reaction is usually exothermic and water is a by-product which should be vacuum stripped after the aldehyde addition is completed.

The tackifier of the invention is usually a brittle solid at room temperature which can be converted to flakes or dispersed in carrier liquid such as rubber process oils or plasticizers.

The amount of tackifying agent used in a rubber composition is largely dependent upon the use to which the rubber is to be put, and the type of rubber being employed, and the method of construction or fabrication being utilized. Generally, amounts of about two to one hundred parts of tackifier per hundred parts of rubber can be used, and for specific applications such as conveyor belting, hose, and tire sidewalls of EPDM rubber, the preferred amount of tackifier is about 2 to 20 parts per hundred.

The tackifier can be conveniently admixed with the rubber by any of the conventional blending means known to the art. Illustrative of such blending means are stirring in mechanical mixers or blenders, milling, grinding, and the like. If desired, these resins can also be applied to the rubber as a surface coating by using a solution of the resin in a suitable solvent such as petroleum ether, gasoline, dioxane and the like and allowing the solvent to evaporate. Frequently a rubber is also included in such solutions to form general purpose pressure sensitive adhesives.

The term "rubbers" as used herein includes not only the many various grades of natural rubbers but also, and preferably, materials known as the synthetic rubbers. Natural rubbers include of course all grades commercially available as well as all forms such as smoked sheet, pale crepe, and the like. The synthetic rubbers can be homopolymers or copolymers of two or more monomers which yield a polymer having rubbery characteristics. Many of these rubbers are of the butadiene type, i.e. polybutadiene, butadiene-styrene copolymers, butadiene-acrylonitrile copolymers, butadiene-styrene-acrylonitrile terpolymers, polyisoprene, polychloroprene and the like rubbers, isobutylene homopolymers and copolymers such as butyl rubber, and the like, as well as the rubbery ethylene-propylene copolymeric materials such as ethylene-propylene rubbers, the ethylene-propylene-diene terpolymer rubbers and the like, halogenated olefin polymers such as chlorinated polyethylene, the polypropylene oxide rubbers, and the like.

All the above rubbers are well known. The ethylene-propylenediene terpolymer (EPDM) rubbers, are, however, the most preferred rubbers to be used with the invention.

It should be noted that while natural rubber generally has sufficient inherent tack for most applications so that tackifying agents are not necessary, tack of these materials can be increased by use of the tackifying agents of the present invention.

Natural and reclaimed rubber can be added to standard rubber stock compositions to produce a stock of smooth uniform consistency. Blends of various rubbers can of course be used in this invention, particularly desirable of which are blends of natural and synthetic rubbers.

It is contemplated that normal rubber additives can be present in the rubber stock of the present invention. Such additives include pigments, fillers, vulcanizers, accelerators, stabilizers, oxidation inhibitors and the like, as have been presently employed in the field or rubber technology.

One of the most commonly used and perhaps most useful additives to rubber stock is carbon black. This additive serves totally or in part as a reinforcing filler, a vulcanization aid, a pigment, a stabilizer, and an antioxidant, and for these reasons has acquired widespread use in such products as vehicle tires, mechanical goods and the like.

The following test procedures are used to measure the relative tack of the elastomer compositions in the examples that follow:

1. Instron Peel Strength Test

Six ½ × 5 inch individual specimens are cut from each sample keeping a sheet of Mylar in place to protect the surface from contamination. Two specimens with the Mylar removed from all but the tab section are then assembled face-to-face on a flat surface. Care must be taken to align specimens accurately to ensure exact ½ inch wide peel surface. Immediately after assembling the test piece it is rolled gently with a cylindrical 2 kg weight starting at the end away from the tab proceeding over the tab and back to the end. A stopwatch is started and a test piece is mounted in the jaws of an Instron testing machine, starting downward crosshead travel at a rate of 5 cm/min. at exactly 30 seconds elapsed time.

The above procedure yields a continuous record of peel forces required and enables calculation of peel strength and work to peel.

2. Tel-Tak Test

Another test employed to measure tack and stickiness is the "Tel-Tak" test, employing a tackmeter sold by Monsanto Co., Testing Instruments Division. "True tack" is calculated as the numerical difference between the rubber-to-rubber tack and the rubber-to-metal stick values. High tack and "true tack" values are desirable; stick values should be as low as possible.

The following non-limiting examples are presented to illustrate but a few embodiments of the invention. All parts are by weight unless otherwise indicated.

EXAMPLE I

This example illustrates preparation of a tackifier composition in accordance with the invention. A mixture of 1032 parts dodecyl phenol, 168 parts 1, 8-p-menthane diamine, 34 parts water, and 7.2 parts oxalic acid is heated to 102°C. Then 360 parts of 37% aqueous formaldehyde are gradually added, after which water is vacuum stripped and the temperature is allowed to rise to 140°C. The mole ratio of dodecyl phenol to 1, 8-p-menthane diamine to formaldehyde used in the reaction is 0.8 to 0.2 to 0.9. The product is a hard brittle solid having a Ring and Ball softening point of 101°C., a methylol content of 0.02% and an acid number of 9.6, and can be crushed or flaked at room temperature and does not sinter.

EXAMPLE II

A comparative tackifier is prepared as follows: 300 parts octyl phenol, 8.5 parts water and 1.8 parts oxalic acid are heated to 102°C. Then 97.5 parts of 37% aqueous formaldehyde are gradually added, after which water is vacuum stripped and temperature is allowed to rise to 140°C. The product is a hard brittle solid having a Ring and Ball softening point of 91°C., methylol content of 0.5 and acid number of 33, and can be crushed or flaked at room temperature and does not sinter.

EXAMPLE III

A second comparative tackifier is prepared as follows: 300 parts dodecyl phenol, 8.5 parts water, and 1.8 parts oxalic acid are heated to 102°C. Then 76.7 parts of 37% aqueous formaldehyde are added gradually after which water is vacuum stripped and the temperature allowed to rise to 140°C. The product is a solid which can be crushed or flaked only at subnormal temperatures and sinters at room temperature.

EXAMPLE IV

Ten parts of each of the tackifiers prepared in Example I, II, and III are milled into a rubber masterbatch formulation containing 100 parts EPDM rubber, 50 parts process oil, 110 parts N-550 (FEF) carbon black, 5 parts zinc oxide, 1 part stearic acid, and sheeted off at 100 mils. thickness, and the three tackifier/masterbatch formulations are compared in the following example, along with a control sample of masterbatch without tackifier.

EXAMPLE V

This example illustrates sample preparation and tack measurement. The sheets prepared in Example IV are molded at 100°C. in a hydraulic press between Mylar release sheets to get a very smooth surface for tack measurements. A piece of burlap is used as a backing material to give the sample rigidity for test purposes.

The tack measurements for the tackifier of the invention, Example I, versus the comparative tackifiers, Examples II and III, and versus no tackifier at all (control), were as follows:

| Example | Instron Peel Test | | "Tel Tak" | | |
| | Max. Peel Strength (lbs./linear inch) | Work to Peel (in-lbs./in$^2$) | Tack | Stick | True Tack |
|---|---|---|---|---|---|
| I | 7.6 | 46.3 | 33 | 14 | 19 |
| II | 5.8 | 31.6 | 22 | 15 | 7 |
| III | 4.9 | 28.2 | 16 | 8 | 8 |

-continued

| Example | Instron Peel Test Max. Peel Strength (lbs./linear inch) | Work to Peel (in-lbs./in²) | Tack | "Tel Tak" Stick | True Tack |
| --- | --- | --- | --- | --- | --- |
| Control | 4.6 | 23.7 | 20 | 5 | 15 |

I claim:

1. A composition comprising a synthetic rubber selected from the group consisting of polybutadiene, butadiene-styrene copolymers, butadiene-acrylonitrile copolymers, butadiene-styrene-acrylonitrile terpolymers, polyisoprene, polychloroprene, isobutylene homopolymers and copolymers, ethylene propylene rubbers, ethylene-propylene-diene terpolymer rubbers, halogenated olefin polymers, propylene oxide rubbers, or mixtures of said synthetic rubber with natural rubber, and as a tackifier for the rubber, from about 2 to about 20 parts by weight per 100 parts rubber of the composition prepared by a process comprising reacting about 0.7 to 1.3 mole parts aldehyde with about 0.50 to 0.95 mole parts of predominantly mono-substituted phenol and about 0.50 to 0.05 mole parts of aliphatic or cycloaliphatic polyamine containing at least two primary amine groups in the presence of acid catalyst.

2. A composition in accordance with claim 1 wherein the synthetic rubber is ethylene-propylene-diene terpolymer.

3. A method for imparting building tack to rubber stock comprising thoroughly admixing with said rubber from about 2 to about 100 parts per 100 parts rubber of the composition prepared by a process comprising reacting about 0.7 to 1.3 mole parts aldehyde with about 0.5 to 0.95 mole parts of predominantly mono-substituted phenol and about 0.50 to 0.05 mole parts of aliphatic or cycloaliphatic polyamine containing at least two primary amine groups in the presence of acid catalyst.

4. The method of claim 3 wherein the rubber stock is an ethylene-propylene-diene terpolymer rubber.

* * * * *